(12) United States Patent
Bo

(10) Patent No.: US 6,373,670 B1
(45) Date of Patent: Apr. 16, 2002

(54) FAULT PROTECTION APPARATUS

(75) Inventor: Zhiqian Bo, Bath (GB)

(73) Assignee: Alstom UK Limited (GB)

( * ) Notice: Subject to any disclaimer, the term of this patent is extended or adjusted under 35 U.S.C. 154(b) by 0 days.

(21) Appl. No.: 09/397,545

(22) Filed: Sep. 16, 1999

(30) Foreign Application Priority Data

Sep. 17, 1998 (GB) ............................................. 9820140

(51) Int. Cl.$^7$ ................................................ H02H 3/00
(52) U.S. Cl. ............................. 361/81; 361/66; 361/69
(58) Field of Search .......................... 361/80, 81, 115, 361/66, 69

(56) References Cited

U.S. PATENT DOCUMENTS

| | | | |
|---|---|---|---|
| 4,484,245 A | * 11/1984 | McFall | 361/68 |
| 4,528,611 A | * 7/1985 | Udren | 361/81 |
| 4,674,002 A | * 6/1987 | Li et al. | 361/66 |
| 4,725,914 A | * 2/1988 | Garitty | 361/76 |
| 4,896,241 A | * 1/1990 | Li et al. | 361/66 |
| 5,838,525 A | * 11/1998 | Ward et al. | 361/69 |

FOREIGN PATENT DOCUMENTS

| | | |
|---|---|---|
| GB | 1 274 117 | 5/1972 |
| GB | 1 537 841 | 1/1979 |
| GB | 2 018 063 A | 10/1979 |
| GB | 2 054 964 A | 2/1981 |

OTHER PUBLICATIONS

ALSTOM, *Service Manual R5943D*, vol. 1, Chapter 2, pp. 16–17 and 24–27, 1996

* cited by examiner

*Primary Examiner*—Stephen W. Jackson
(74) *Attorney, Agent, or Firm*—Kirschstein, et al.

(57) ABSTRACT

A fault protection apparatus is disclosed for use in a time graded fault protection scheme. The apparatus comprises a circuit breaker having a normally closed trip contact provided in a line, current measurement apparatus adapted to produce an output signal indicative to the current in the line at the circuit breaker, and fault signal processing apparatus adapted to process the output signal from the current measurement apparatus to detect an initial fault on the line at a first instance. The fault signal processing apparatus is further adapted to process the output of the current measurement apparatus after the initial fault has been detected and to produce an accelerated opening signal in the event that the output signal meets a predetermined criteria, and a control device which is adapted to open said circuit breaker trip contact in response to said accelerated opening signal.

19 Claims, 10 Drawing Sheets

FAULT PROTECTION APPARATUS

This invention relates to improvements in fault protection apparatus for protecting electrical power lines, and in particular to an improved time graded fault protection apparatus.

One of the most important fault protection techniques for power lines is known as Overcurrent Protection. In this technique, a circuit breaker is provided which in normal operation is closed to connect two portions of a line. A current measurement means, typically a current transformer, monitors current flowing in the line through the circuit breaker. This is often referred to as a relay. The output of the current measurement means is monitored by a fault detection means, and in the event that the output corresponds to a current indicative of a fault condition the circuit breaker is opened to isolate one portion of the line from the other.

On extended lengths of power line, more than one circuit breaker (and associated current measuring means and fault detection means) are provided. These are spaced apart along the electrical line. In this case, to ensure that only the minimum number of circuit breakers are opened to clear a fault, a time grading strategy is employed whereby each circuit breaker is adapted to be opened after a predetermined time has elapsed following detection of a fault by its associated fault detection means. The current detection means are made directional, i.e. to monitor the current flowing in each direction, and the time delays for each circuit breaker are graded according to their position relative to other circuit breakers on the line, and the direction along the line from the circuit breaker in which the fault has been detected.

A typical prior art apparatus involving five circuit breakers is shown in FIG. 1. The circuit breakers are denoted CB1, CB2, CB3, CB4 and CB5 and are provided in series between a first end 'R' of a protected line and a second end 'R'. Each circuit breaker is provided with two current measurement relays, one for each direction. The time delays for each circuit breaker, starting with that nearest the first end are $T_1$, $T_2$, $T_3$, $T_4$ and $T_5$ were $T_5 > T_4 > T_3 > T_2 > T_1$.

These time delays relate to the time which elapses after a fault has been detected at a respective circuit breaker until the breaker is opened for a fault in the direction of the first end of the line, i.e. to the left of the circuit breaker.

For a fault in the direction of the second end of the line, the delays are (starting with the circuit breaker nearest the second end of the line) $T_1'$, $T_2'$, $T_3'$, $T_4'$ and $T_5'$ where $T_5' > T_4' > T_3' > T_2' > T_1'$. Each circuit breaker therefore has two time delays associated with the breaker. With the exception of the central breaker CB3, these will be different valued.

As can be seen from FIG. 1, the circuit breakers nearest an end of the line open after a shorter delay for current flowing from the direction of the near end.

A problem with the prior art time grading technique arises where line lengths are long and a high number of circuit breakers are provided. In such a case, the some of the time delay may be unacceptably high. Also, the time delays are fixed in value once the apparatus is installed.

In accordance with a first aspect of our invention in a fault protection apparatus for use in a time graded fault protection scheme comprising a circuit breaker means having a normally closed trip contact provided in a line, current measurement means adapted to produce an output signal indicative of the current in the line at the circuit breaker means, and fault signal processing means adapted to process the output signal from the current measurement means to detect an initial fault on the line at a first instance, the fault signal processing means is further adapted to process the output of the current measurement means after the initial fault has been detected and to produce an accelerated opening signal in the event that the output signal meets a predetermined criteria, and control means are adapted to open the circuit breaker trip contact in response to said accelerated opening signal.

The output signal may be adapted to meet the predetermined criteria when an event on the line indicative of the operation of a remote circuit breaker means on the line occurs and the output signal after the operation remains indicative of a fault on the line. Under these conditions on accelerated opening signal may be produced and the circuit breaker may then be opened instantly. If the output signal indicates that a remote circuit breaker has opened and the fault has been cleared from the protected portion of line, no accelerated trip signal will be generated and the circuit breaker may be kept closed.

The current measurement means may comprise a forward and reverse current measurement means adapted to produce an output signal indicative of the current flowing in the line on either side of the fault protection apparatus. This allows the apparatus to decide where the fault is on the line. Two fault signal processing means may then be provided, one for each direction. A directional response to faults can then be achieved.

The fault signal processing means may be adapted to produce an accelerated opening signal if a fault condition meeting the predetermined criteria is detected by the forward current measurement means but not by the reverse opening means. If a fault is initially detected by the reverse current measurement means, a time delayed opening signal may be generated which is used by the control means to open the circuit breaker after a predetermined time delay, say 0.5 seconds.

In accordance with a second aspect of our invention in a directional time graded fault protection apparatus for an electrical line comprising at least two fault protection apparatus respectively provided at a first and second end of a protected portion of the line, each fault protection apparatus comprising at least one circuit breaker means, a forward and reverse current measurement means associated with each circuit breaker means, the forward current measurement means being adapted to measure current flowing in the line from a first direction and, the reverse current measurement means being adapted to measure current flowing in the line from the second opposite direction, control means associated with each circuit breaker, each control means being adapted to open its respective circuit breaker after a first predetermined period of time in response to an initial fault detected by processing the output of the forward current measurement means associated with the breaker and fault signal processing means associated with at least one of said circuit breakers adapted to monitor the output of the reverse current measurement means so that in the event that the output from the reverse current measurement means meets a predetermined criteria after an initial fault has been detected, the control means is adapted to open the respective circuit breaker at an accelerated time.

If the output signal meets the predetermined criteria, the fault signal processing means may be adapted to produce an accelerated opening signal which is used by the control means to open the circuit breaker.

If the output signal does not meet the predetermined criteria, the control means may cause the circuit breaker to open after a predetermined time period has elapsed since an initial fault is detected by the reverse current measurement means.

Thus, the invention provides a time graded fault protection apparatus for a line in which at least one fault protection apparatus is adapted to make an accelerated opening decision for certain fault conditions which increases speed of response. In prior art systems, the slower reacting fault protection apparatus (those at a far end from a fault) can only open the circuit breaker after their predetermined time delay has elapsed following initial fault detection.

The current measurement means may, in an alternative, be replaced by a voltage signal measurement means adapted to measure the voltage on the line. This may be processed to produce a current signal.

There may be additional fault protection apparatus comprising one or more circuit breakers, associated control means and current measurement means provided in the line. Not all of the additional circuit breakers need to be able to open at an accelerated rate. For example, these additional fault protection apparatus may be adapted to monitor the output of the forward and reverse current measurement means and to open the circuit breaker after a first predetermined time delay when the output of the forward circuit measurement means indicates an initial fault on the line, and after a second time delay for faults detected by monitoring the output of the reverse current measurement means.

Preferably, the second time period which elapses is greater than the first time period. Those circuit breakers which are further away from the end of the line from which the current flows may have increasing time delays for that direction.

A fault signal processing means may be associated with each respective circuit breaker. This may be adapted to produce an output signal indicative of an initial fault by processing the output from the current measurement means.

The predetermined criteria used by the fault signal processing means to make the accelerated opening decision may be satisfied if the current measured after the initial detection of a fault indicates that a remote circuit breaker on the line in the direction of the measured fault has opened and the fault has not been cleared from the protected portion of line.

The fault signal processing means may therefore be adapted to detect the operation of another circuit breaker on a portion of line in the direction of the detected fault by processing the output of the current measurement means.

Where the power line is a three-phase line, the current measurement means may be adapted to produce three output sub-signals. Each signal may be associated with a respective phase of the three phase supply. The output sub-signals may be continuous or discontinuous, i.e. a sequence of measured values over time. The output signals may be indicative of the current and/or voltage on the line. They may be digital or analogue.

The fault signal processing means may be adapted to produce an accelerated trip signal by combining values of the output signals obtained substantially at the instant that the initial fault is detected with values of the output signals obtained after the initial fault is detected.

The circuit breaker means may comprise a forward circuit breaker and a reverse circuit breaker associated with the forward and reverse current measurement means respectively. Alternatively, it may comprise a single circuit breaker. The forward and reverse circuit breaker may be located on either side of a load on the line to protect the load. This enables a load to be isolated from a fault regardless of which side of the line it occurs.

Most preferably, the fault signal processing means is adapted to detect changes in the output signals over time after an initial fault in order to sense the operation of another circuit breaker on the line in the direction of the fault.

The fault signal processing means may be adapted to produce an initial fault signal in the event that the output signals indicate an unbalanced fault current condition on the line.

The three-phase system may be represented as the sum of three phase components; a positive sequence having the same phase rotation as the original system, a negative sequence having the opposite phase rotation, and a zero sequence having no phase rotation.

A system is said to be unbalanced when the three currents and/or voltages signals are not of equal amplitude and/or the phase differences between successive signals are unequal.

An unbalanced fault current condition may therefore be detected by providing means adapted to monitor the negative and zero sequence quantities in the output signals.

Other faults which are symmetrical (such as three phase to earth faults) may be detected by monitoring changes in the positive sequence quantity. Changes in the zero and/or positive and/or negative sequence quantities after the initial fault is detected can be used to detect operation of the remote circuit breaker.

A combination of the negative, zero and/or positive sequence values before and after opening of the second circuit breaker is detected can be used to determine the location of a fault of the line. For instance, this can be used to decide if the fault is on the portion of line between the first and second circuit breakers.

The fault signal processing means may be adapted to calculate the RMS (root mean square) values of one or more of the sequence quantities in a first step of processing the sequences to produce the initial fault signal.

The processing means may calculate one or more ratio signals from the measured sequence values. The value of the ratio signals can be used as an indication of a fault condition. For example, if a ratio exceeds a predetermined threshold, a fault can be assumed to have occurred.

A first ratio may comprise the change in the zero and negative sequence quantities. This ratio may, for example, change either on transition from non-fault to a fault condition or upon closure of a remote circuit breaker.

A second ratio may comprise the change in the positive sequence quantity during the time period following initial fault detection. This can provide an indication of the presence of the symmetrical fault.

The first ratio signal may be chosen so as to have a zero value under no fault or symmetrical fault condition as there will be no negative or zero sequence quantities. The first ratio will increase from zero if a unsymmetrical fault is detected. This increase can trigger the initial fault signal. If, subsequently, the ratio returns to zero, the fault has either cleared (transistent fault) or a remote breaker has opened to isolate the fault.

If a symmetrical fault occurs, the second ratio will increase from zero or will return to zero if the fault is cleared by the remote breaker.

Of course, the output signals can be processed in either ways to indicate the presence of a fault and the operation of a remote breaker.

There will now be described, by way of example only, one embodiment of the present invention with reference to the accompanying drawings of which:

Figure 2:
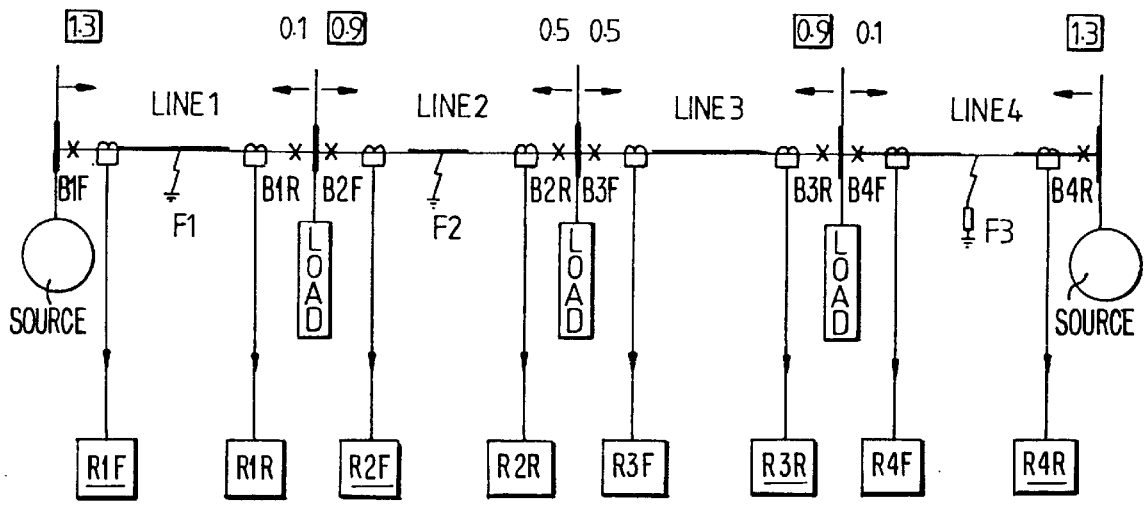
FIG. 2 is an equivalent circuit of a multi-section power line system used to demonstrate one embodiment of the invention.

FIGS. 3a, 3b, 3c, 3d and 3e show the responses of several of the fault protection apparatuses R1F, R1R, R2R, R3R and R4R for a single phase to earth fault on line section LINE 1 respectively; where graphics (1), (2) and (3) in each Figure show the RMS values of the phase, sequence current signals and the ratio signal respectively; $T_1$ is the time of fault inception; $T_2$ is the time when the three phase circuit breaker B1R opens; $T_3$ is the time when the circuit breaker B1F opens;

FIG. 4a, 4b, 4c, 4d and 4e show the responses of the protective apparatuses R1F, R2F, R2R, R3R and R4R for an phase 'a' to phase 'b' fault on line section LINE 2 respectively; where graphics (1), (2) and (3) in each Figure show the RMS values of the phase, sequence current signals and the ratio signal respectively; $T_1$ is the time of fault inception; $T_2$ is the time when the three phase circuit breaker B2R opens; $T_3$ is the time when the circuit breaker B2F opens;

FIGS. 5a, 5b, 5c, 5d and 5e show the responses of the protective apparatuses R1F, R2F, R3F, R4R and R4F for a three phase to earth resistive fault on line section LINE 3 respectively; where graphics (1), (2) and (3) in each Figure show the RMS values of the phase, sequence current signals and the ratio signals respectively; $T_1$ is the time of fault inception; $T_2$ is the time when the three phase circuit breaker B4F opens; $T_3$ is the time when the circuit breaker B4R opens;

An embodiment of the present invention is shown in FIG. 2 of the accompanying drawings. In the illustration, a five fault protection apparatus system is shown. The circuit breakers divide the power line into four sections named line 1, line 2, line 3 and line 4 respectively.

Each fault protection apparatus comprises a forward direction circuit breaker CBF and a reverse direction circuit breaker CBR. The forward circuit breakers are adapted to open in response to currents flowing from the right in the FIG. 2. A directional current measurement device R is associated with each circuit breaker.

The fault protection apparatus are divided into two groups. The first group consists of conventional time graded circuit breakers which open after either a first or a second predetermined time period as in the prior art.

The second group consists of circuit breakers which can be opened at an accelerated rate dependent upon fault condition in response to an accelerated fault signal. Circuit breakers on the second group are shown by the use of an underscore in the figure. It can be seen that the second group consists of those circuit breakers which would have the longest default time delay in a conventional time graded scheme and which therefore benefit most from acceleration operation.

As an example of the operation of the fault detection apparatus, a fault occurring on section line 1 can be considered, for example at point 'F1'.

Each fault protection apparatus comprises a forward and reverse circuit breaker and a forward and reverse current measurement means, referred to hereinafter as relays. Only relays R1F, R1R, R2R, R3R and R4R will detect the fault since the fault is in the forward direction for these current measurement means. The conventional relays R1R and R2R will operate after their predetermined fixed time periods. The accelerated circuit breakers and associated current measurement means R1F, R3R and R4R will monitor the current to determine if it is appropriate to accelerate their opening before their predetermined fixed time periods have elapsed.

To decide whether or not to open at an accelerated time, a fault signal processing means is provided for each circuit breaker. This processes the output of the current measurement means to determine if the fault is on the section of line associated with that circuit breaker by monitoring the operation of a circuit breaker at or beyond the other side of the protected section line. If a fault is detected on the portion of line protected by the circuit breaker, and the fault remains when the other (remote) circuit breaker has opened, the fault signal processing means will instruct the control means to trip its associated circuit breaker. If the fault has cleared, the circuit breaker will remain closed. The process used by the fault detection circuit to detect the type of fault and its location is outlined hereinafter.

With the fault of LINE 1, the circuit breaker R1R which has the fastest opening time will operate first to open its breaker. After it has opened, the fault is isolated from the sections LINE 2, LINE 3 and LINE 4. The relays R2R, R3R and R4R operate under a normal time grading scheme and so are restrained from opening. However, even though R1R opens one end of the line 1 portion. It does not clear the fault on the line section line 1. The circuit breaker R1F detects the opening of R1R and the persistence of the fault currents and so decides that the fault is on the section LINE 1 and opens its associated circuit breaker at an accelerated time. This process can be performed by comparing the output signal from the current measurement means to one or more predetermined criteria.

On a three phase line, the current measurement means produces a directional indication of the current and/or voltage on each phase.

In normal operation with no faults, it is expected that the currents on each phase will be in a balanced condition. For most faults, the currents will enter an unbalanced operating condition. If a breaker is opened at one end of a line portion which clears the fault on that portion, the circuit breaker at the other end should see the current return to a balanced state. This would indicate that the fault is not present on that portion of line, and accelerated opening would not occur as it would not produce an accelerated fault signal.

If the remote circuit breaker at one end of the line section opens and the currents on the section remain unbalanced, accelerated opening can be initiated as the fault has not been cleared. Of course, it would be necessary to detect operation of the remote circuit breaker in order to decide that it did not clear the fault. This can be done either with knowledge of the expected time of closure of the remote circuit breaker in conjunction with monitoring of the output of the current measurement means, or by monitoring to detect changes in the line currents which could indicate an opening event. The later is preferred.

It is known that most faults are asymmetrical and generate negative and zero sequence quantities. These can be detected and used as a basis for deciding if the system is in a balanced or unbalanced state as well as to detect operation of a remote breaker by the fault detection means.

In the present invention, the positive, negative and zero sequence quantities can be derived through a real-time processing algorithm. The Root-Mean-Square (known as RMS) values of these sequence quantities are then computed and the levels of which are compared and used to determine the system condition. In particular, the changes in these quantities are used to identify the operation of remote circuit breaker(s).

The positive, negative and zero sequence quantities can be expressed as follow:

$$S_1 = (S_A + a\ S_B + a^2 S_C)/3$$
$$S_2 = (S_A + a^2 S_B + a S_C)/3$$
$$S_0 = (S_A + S_B + S_C)/3 \qquad (1)$$

Where $S_A$, $S_B$ and $S_C$ are three phase power frequency voltages or currents;

$S_1$, $S_2$ and $S_0$ are positive, negative and zero sequence quantities.

Equ. (1) can be expressed as (2) when time interval $\Delta T = T/3$ $$S_1 = \left(S_A + S_B e^{-j 2\frac{T}{3}} + S_C e^{-j\frac{T}{3}}\right)/3 \quad (2)$$

$$S_2 = \left(S_A + S_B e^{-j\frac{T}{3}} + S_C e^{-j 2\frac{T}{3}}\right)/3$$

$$S_0 = (S_A + S_B + S_C)/3$$

where T is the period for power frequency, which can be either 50 or 60 Hz.

when Equation (2) is expressed in time domain:

$3s_1(t)=s_A(t)+s_B(t-2T/3)+s_C(t-T/3)$ $3s_2(t)=s_A(t)+s_B(t-T/3)+s_C(t-2T/3)$ $3s_0(t)=s_A(t)+s_B(t)+s_C(t)$ \quad (3)

if a digital sampling rate of $\omega T_s = 30°$ is used, the discrete form of (3) is given as:

$3s_1(k)=s_A(k)+s_B(k-8)+s_C(k-4)$ $3s_2(k)=s_A(k)+s_B(k-4)+s_C(k-8)$ $3s_0(k)=s_A(k)+s_B(k)+s_C(k)$ \quad (4)

As shown, 8 past samples are required for the computation of the positive and negative sequence quantities by using (4), the time delay is unacceptable for the application here.

The way to speed up calculation is to reduce the required samples, that is to reduce the power of the 'e' in equation (2). The mathematical relationship of Equation (5) can be utilized $$e^{\pm ja} = 2\cos\left(\frac{a}{2}\right)e^{\pm j\frac{a}{2}} - 1 \quad (5)$$

By using (5), Equation (6) can be derived as follow:

$e^{\pm j120°} = e^{\pm j60°} - 1 = \sqrt{3}e^{\pm j30°} - 2$ $e^{\pm j240°} = -e^{\pm j120°} - 1 = -e^{\pm j60°} = -\sqrt{3}e^{\pm j30°} + 1$ \quad (6)

using Equation (6) in (2), the following equation is derived $S_1 = (S_A - \sqrt{3}S_B e^{-j30°} + S_B + \sqrt{3}S_C e^{-j30°} - 2S_C)/3$ $S_2 = (S_A + \sqrt{3}S_B e^{-j30°} - 2S_B - \sqrt{3}S_C e^{-j30°} + S_C)/3$ $S_0 = (S_A + S_B + S_C)/3$ \quad (7)

express Equation (7) in time domain:

$3s_1(t) = s_A(t) - 2s_C(t) + s_B(t) + \sqrt{3}[s_C(t-T/12) - s_B(t-T/12)]$ $3s_2(t) = s_A(t) - 2s_B(t) + s_C(t) + \sqrt{3}[s_B(t-T/12) - s_C(t-T/12)]$ $3s_0(t) = s_A(t) + s_B(t) + s_C(t)$ \quad (8)

using the same sampling rate $\omega T_s = 30°$ as in (4), Equation (9) is obtained:

$3s_1(k) = s_A(k) - 2s_C(k) + s_B(k) + \sqrt{3}[s_C(k-1) - s_B(k-1)]$ $3s_2(k) = s_A(k) - 2s_B(k) + s_C(k) + \sqrt{3}[s_B(k-1) - s_C(k-1)]$ $3s_0(k) = s_A(k) + s_B(k) + s_C(k)$ \quad (9)

Equ. (9) only requires one sample delay to compute the positive and negative sequence quantities, therefore significantly increase the speed of the computation.

The RMS values of the discrete sequence quantities can be derived using equation (10):

$$\overline{S}_x(k) = \sqrt{\frac{1}{2}\left[s_x^2(k) + \left(\frac{s_x'(k)}{\omega}\right)^2\right]} \quad (10)$$

where $s_x(k)$, $\overline{S}_x(k)$ represent discrete and RMS values of the positive, negative and zero sequence quantities respectively for x=1, 2, 0

Two ratio signals can be used to detect whether a system is in a balanced operation or not. Firstly, the change in the zero and negative sequence quantities with respect to the change of the positive sequence quantity is used as the main criterion to detect whether the system is in a balanced operation condition or not. A ratio signal is given in equation (11)

$$R_1(k) = \frac{\overline{S}_2(k) + \overline{S}_0(k)}{\overline{S}_1(k)} \quad (11)$$

To cover some special fault condition, such as three phase and three phase to earth faults, which may produce a balanced fault condition, an additional criterion is also used to represent the changing of the positive sequence quantity during fault period, which is given as:

$$R_2(k) = \frac{\overline{S}_1(k) - \overline{S}_{1pre}}{\overline{S}_{1pre}} \quad (12)$$

where $\overline{S}_{1pre}$ is the RMS value of the pre-fault positive sequence quantity The signal $R_1$ will be of zero value under no fault or symmetrical fault condition since there is no presence of negative and zero sequence quantities, and will be increased to a level well above zero if an unsymmetrical fault present on the system. Under the symmetrical fault condition, the signal $R_2$ will increase to a level and return to a value around zero after the clearance of the fault from the system. The theoretical values for the signal $R_1$ will be '1' for phase to phase fault and '2' for phase to earth fault with remote circuit breaker open. The level of signal $R_2$ will be well above '1' depending on the pre- and post fault system condition. As a result, a preset threshold above zero level (say between 0.2 and 0.2) can be used to determine the system fault condition by examining whether the one of the two ratio signals $R_1$ and $R_2$ has exceeded it or not.

Based on the configuration given in FIG. 2, the following examples are used to demonstrate the performance of the apparatus.

1. Responses to Single Phase Fault on Line Section LINE 1

FIG. 3 shows the responses of the scheme to an 'a' phase to earth fault on line section LINE 1 as shown in FIG. 2. For this fault location, the relays R1F, R1R, R2R, R3R and R4R will detect as a forward direction fault to the location where these relays are installed and the responses of which are given in FIGS. 3a, 3b, 3c, 3d and 3e respectively. After fault inception at time $T_1$, there is a significant increase in the faulted phase current as shown in FIGS. 3a–e(1). As a result, the negative and zero sequence current signals also increase significantly as shown in FIGS. 3a–e(2), and subsequently the ratio signal as given in Equ.(11) increases to a level well above the present threshold as shown in FIGS. 3a–e(3).

Figure 3A:
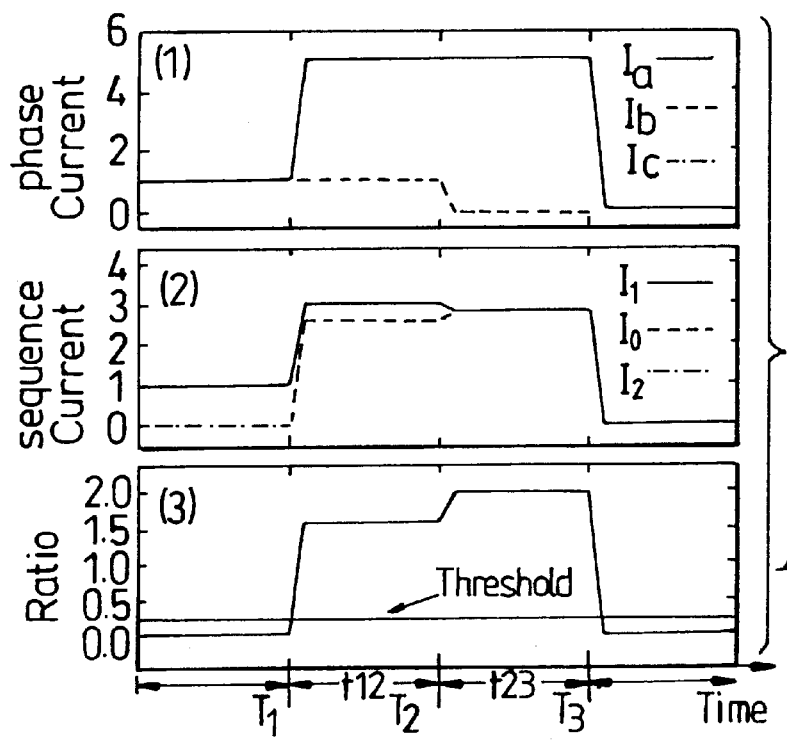

The relay R1R which has the fastest operating time setting will make a trip decision at 0.1 second and subsequently the circuit breaker B1R opens at the time $T_2$. After the opening of the circuit breaker B1R, the line sections LINE 2, LINE 3 and LINE 4 are isolated from the fault. As a result, the measured currents return back to a balanced operation condition as shown in FIGS. 3c–e(1) and subsequently the negative and zero sequence currents as shown in FIGS. 3c–e(2) and the ratio signals as shown in FIGS. 3c–e(3) drop back to zero. The circuit breakers associated with the relays R2R, R3R and R4R restrain from operation. It should be mentioned here that the levels of the current signals may return to levels slightly different from their pre-fault values due to the change in the circuit condition after the opening of the circuit breaker B1R.

Figure 3B:
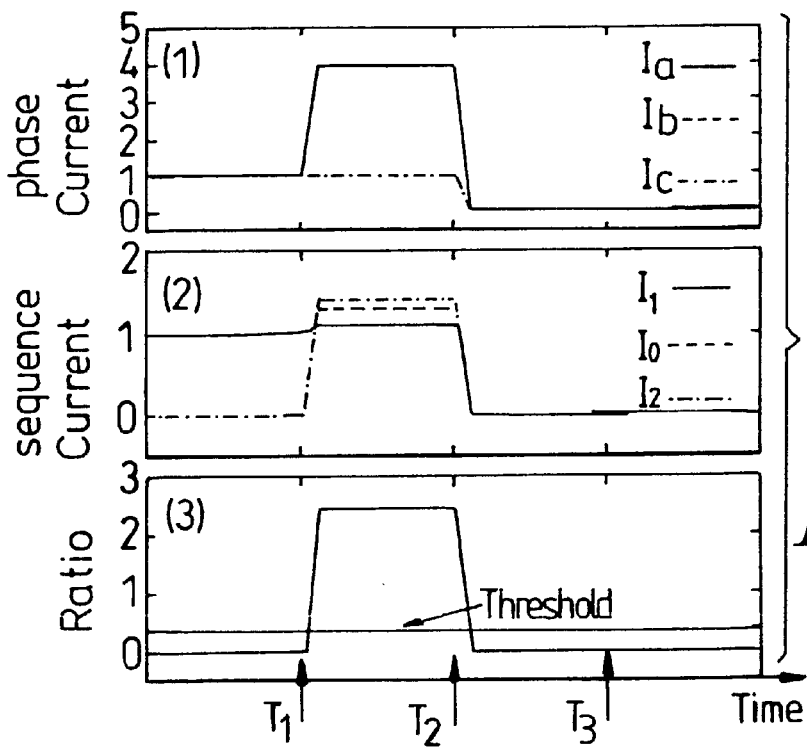
Figure 3C:
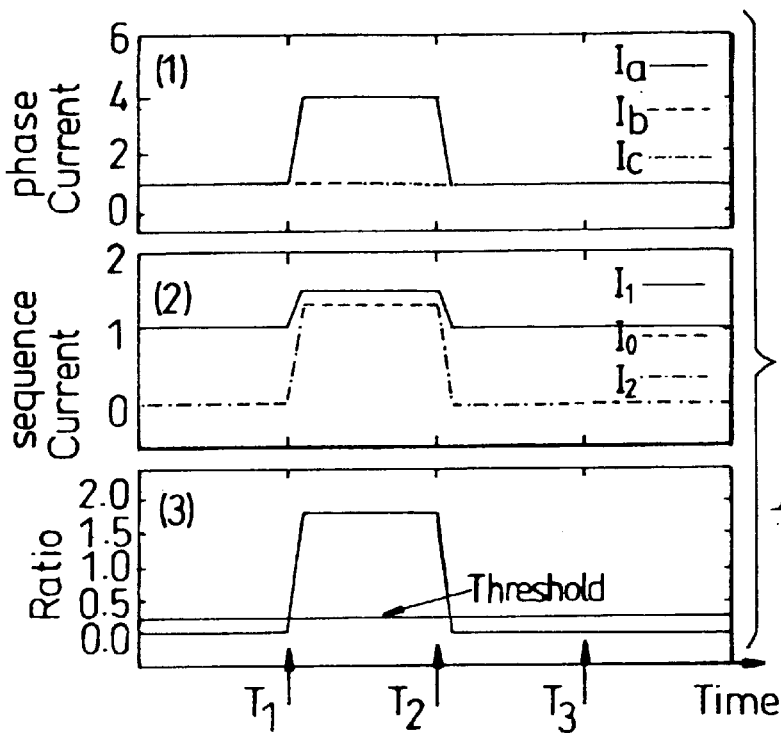
Figure 3D:
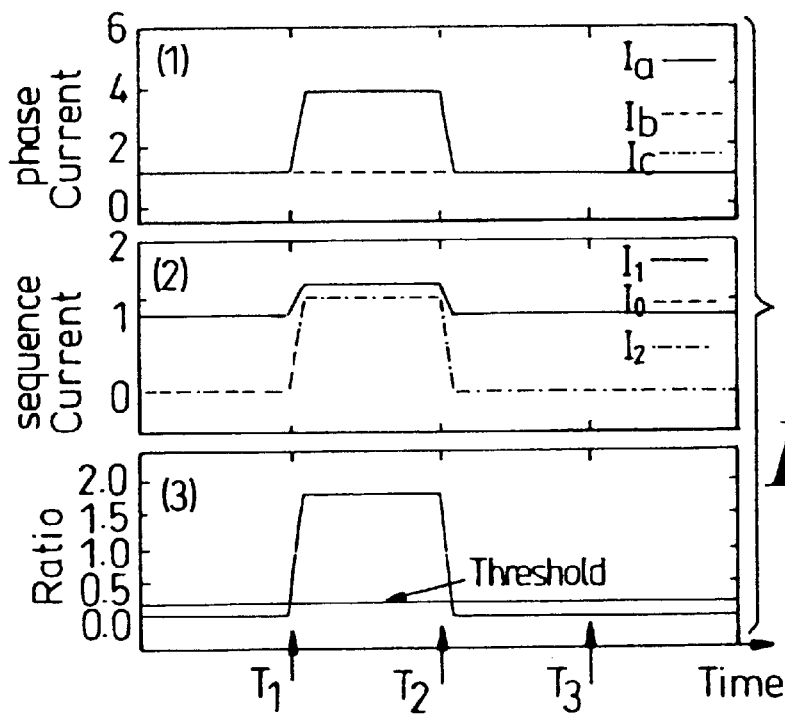
Figure 3E:
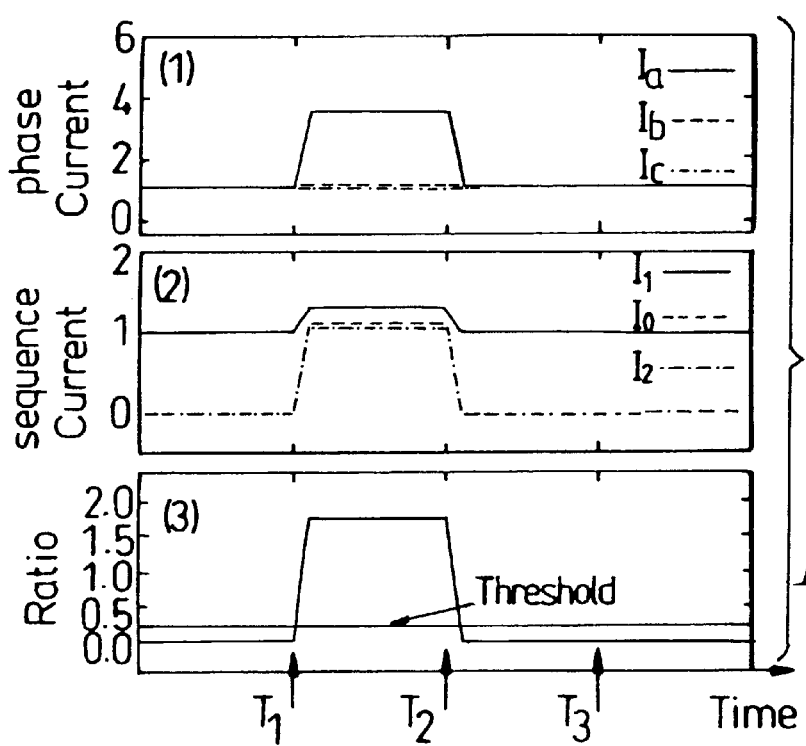

After the opening of the circuit breaker B1R, the line section LINE 1 becomes open circuit at one end, the phase, sequence current and ratio signals drop to zero at relay R1R location as shown in FIG. 3b. Although the currents of the unfaulted phases 'b' and 'c' also drop to zero at relay R1F location as shown in FIG. 3a(1), the phase 'a' to earth fault is not cleared from the line section LINE 1, the ratio signal is kept at a level of '2' as shown in FIG. 3a(3), which is the theoretic level for this single phase to earth fault condition. As a result, the relay R1F detects the opening of the circuit breaker B1R and makes a trip decision and open the associated circuit breaker B1F at the time $T_3$. As a result, the operating time of the circuit breaker associated with relay R1F has been significantly reduced our prior art systems.

Figure 1:
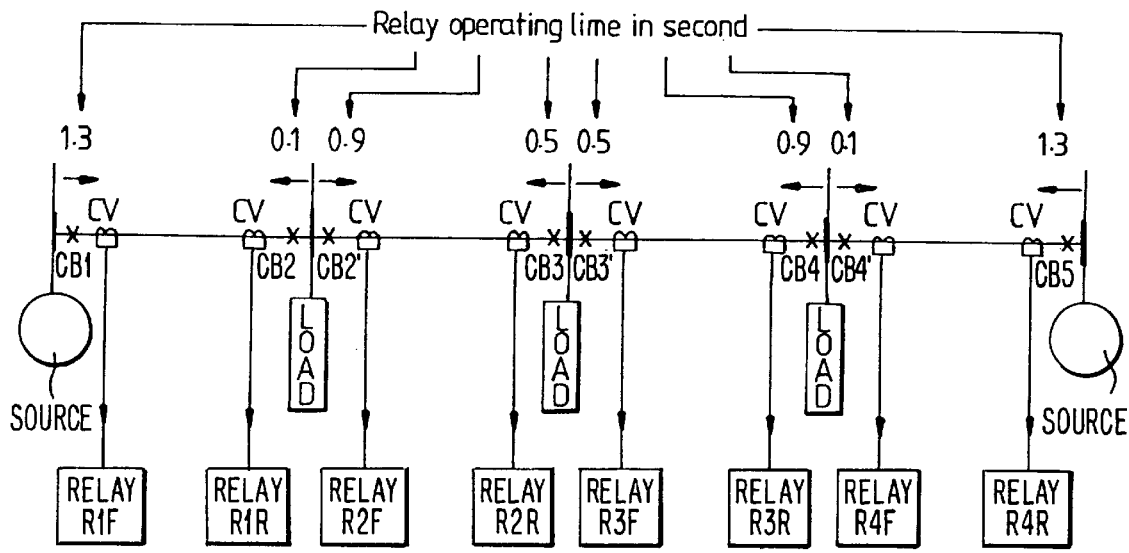
FIG. 1 is an equivalent circuit for a typical overcurrent directional time graded fault protection scheme.

As shown in the FIG. 3a, the time delay from the fault inception at time $T_1$ to the opening of the circuit breaker B1F at time $T_3$ mainly consists of 2 time periods, the t12 and t23. The first time period t12 consists of the time period from the fault inception to the opening of the circuit breaker B1R. This time period is mainly dependent on the fixed time setting of the relay since the opening of the circuit breaker only takes a few power frequency cycles. In this fault condition, a 0.1 second delay is set for the relay R1R to operate. The second time period t23 consists of the time taken for the apparatus R1F to identify the operation of breaker B1R which can be accomplished within half to one power frequency cycles plus the response time of the circuit breaker B1F which is approximately 2 to 4 cycles depending on the circuit breaker used. As a result, the entire operation can be implemented within 0.2 to 0.3 seconds from the fault inception. In the conventional scheme as shown in FIG. 1, however, the relay at the location of R1F will not even trip until its predetermined delay time which could be for greater.

2. Responses to Phase to Phase Fault on Line Section LINE 2

FIG. 4 show the responses of the scheme to an 'a'–'b' phase to phase fault on the line section LINE 2. In this fault location, the relays R1F, R2F, R2R, R3R and R4R detect a forward direction fault and their responses are shown in FIG. 4a–e respectively. As shown, there are significant increases in faulted phase and the negative sequence current signals after fault inception at time $T_1$ as shown in FIGS. 4a–e(1–2). There are no zero sequence current present since the fault does not involve earth.

The circuit breaker associated with relay R2R has the fastest time setting of 0.5 second and so operates first. This subsequently opens the circuit breaker at B2R at time $T_2$. Afterwards, the fault is isolated from the line section LINE 3 and LINE 4 and the circuit breakers associated with relays R3R and R4R restrain from operation.

Figure 4A:
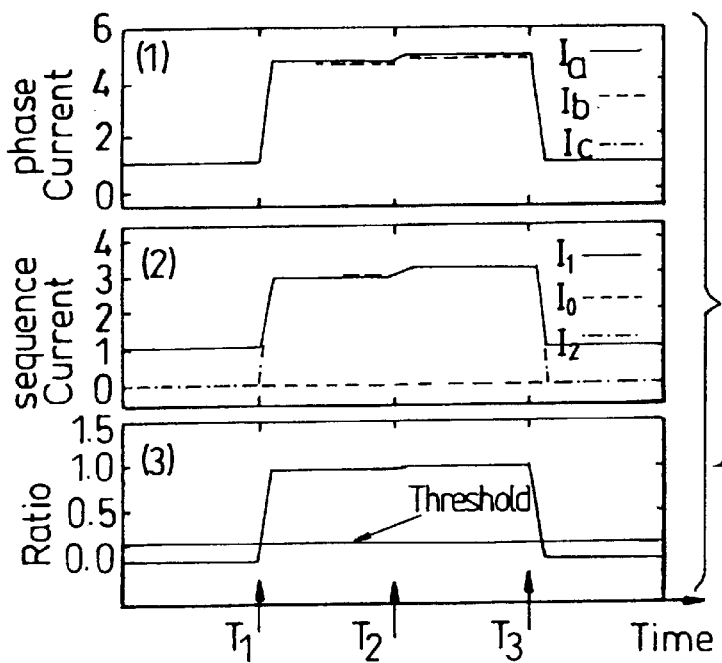
Figure 4B:
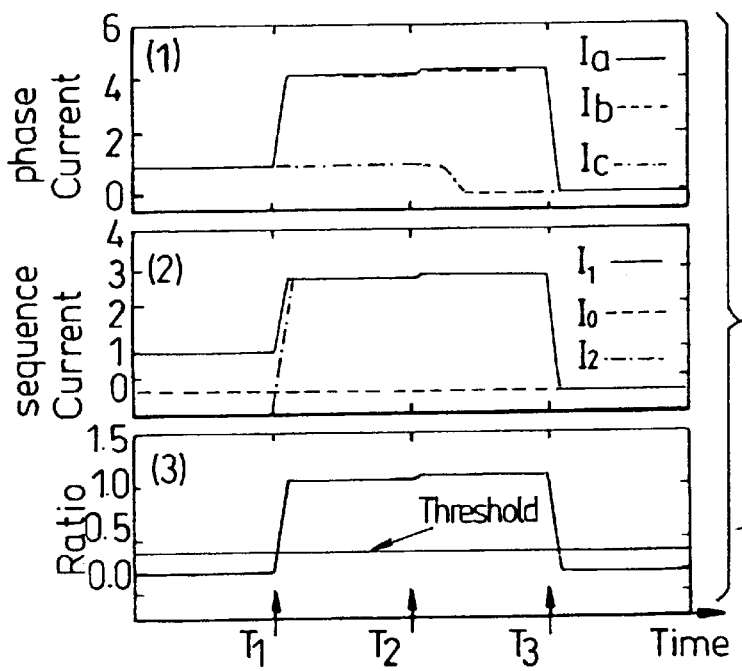
Figure 4C:
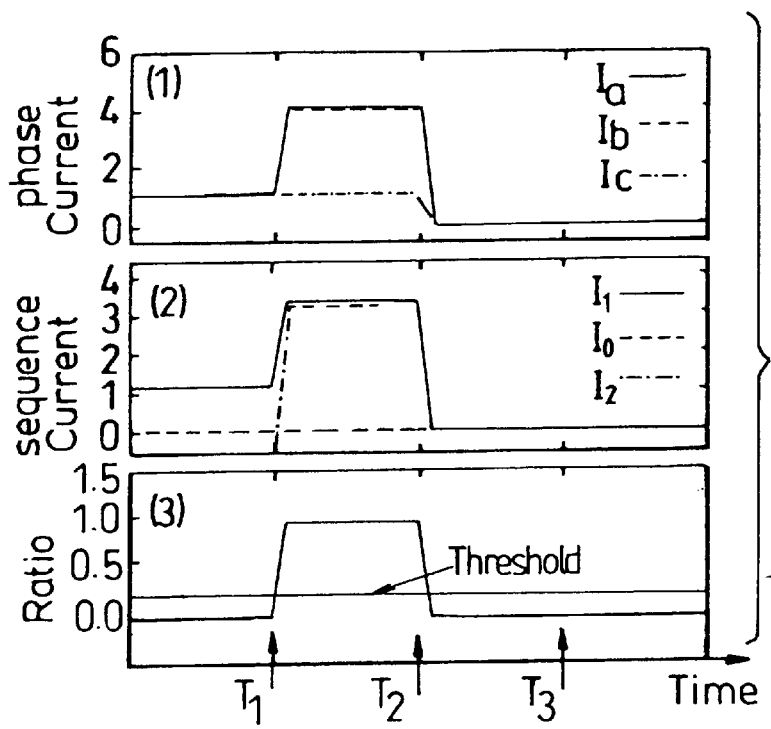
Figure 4D:
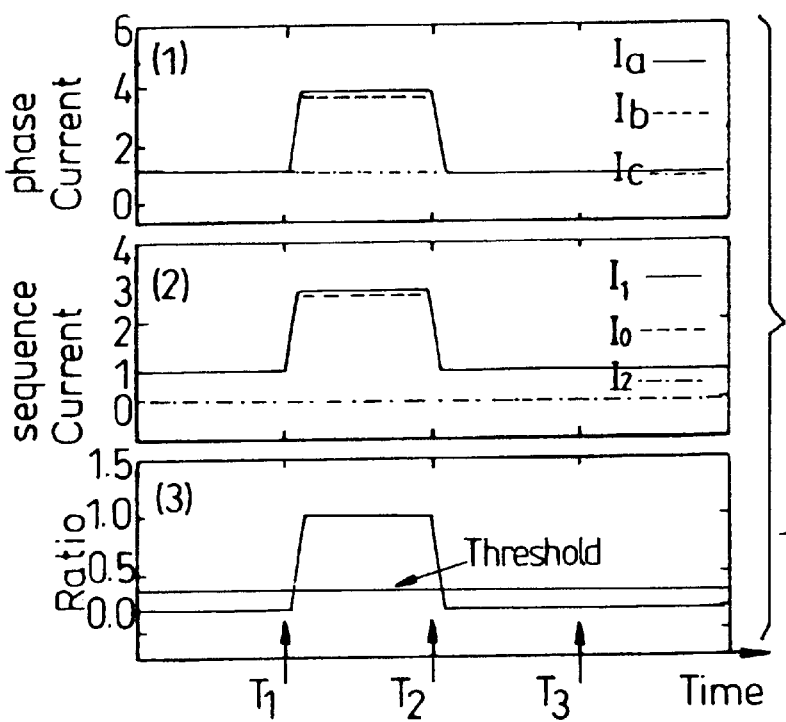

As shown in FIG. 2, for a fault on the line section LINE 1, the operation of the circuit breaker associated with relay R1R at 0.1 seconds and subsequently the opening of the circuit breaker at B1R is expected within the 0.5 seconds after fault inception. However, for a fault on the line section LINE 2, there will be no opening of the circuit breaker at B1R within the 0.5 seconds time period after fault inception and the relay R2R will operate its circuit breaker after a 0.5 seconds time delay. The relay R1F is arranged to only accelerated operate if the opening of the circuit breaker B1R is detected within the 0.5 second periods and will restrain from accelerated operation after the 0.5 second time delay. In this case, within the 0.5 second period from the fault inception, the relay R1F detects no opening of the circuit breaker B1R due to the presence of the unfaulted phase 'c' current as shown in FIG. 4a(1). As a result, the circuit breaker associated with relay R1F is prohibited from the accelerated operation.

The relay R2F, however, detects the operation of the circuit breaker at R2R through the ratio signal is at a level of '1' for the phase to phase fault condition and the unfaulted phase 'c' currents drops to zero, subsequently makes a trip decision and opens its associated circuit breaker at B2F at time $T_2$. The faulted section LINE 2 is tripped at both ends. At the same time, the line section LINE 1 is isolated from the fault and the circuit breaker associated with relay R1F restrain from operation.

3. Responses to Three Phase Fault on Line Section LINE 4

For a three phase or three phase to earth solid (no resistance in the fault path) fault, maximum current will be produced on this fault condition which can be protected by the high set instantaneous operation of the overcurrent relay together with the IDMT (please refer to Reference [1]). However, when resistance is presented in the fault path, the magnitudes of the three phase current signals could be significantly reduced and this could prevent the instantaneous element of the relay from tripping. The following example demonstrates the performance of the invented apparatus under three phase resistance fault condition.

FIG. 5 shows the responses of the scheme to a three phase resistive earth fault on the line section LINE 4. Since this is a symmetric fault, there is neither zero nor negative sequence component presents as shown in FIGS. 5a–e(2), and as a result, the signal ratio $R_1$ as given in Equation(11) remains unchanged for the entire period as shown in FIGS. 5a–e(3). In this situation, as shown in FIGS. 5a–e(3), the relays rely on the signal $R_2$ as given in Equation(12) for decision making.

As shown in FIGS. 5a–e the relays R1F, R2F, R3F, R4F and R4R detect this forward fault condition and the relay circuit breaker at R4F with the fastest time setting will trip first at time of 0.1 second and subsequently open its associate breaker B4F at time $T_2$. As expected, the opening of the circuit breaker at B4F will isolate the line sections LINE 1, LINE 2 and LINE 3 from the fault and restrain the circuit breakers associated with relays R1F, R2F and R3F from operation.

Figure 4E:
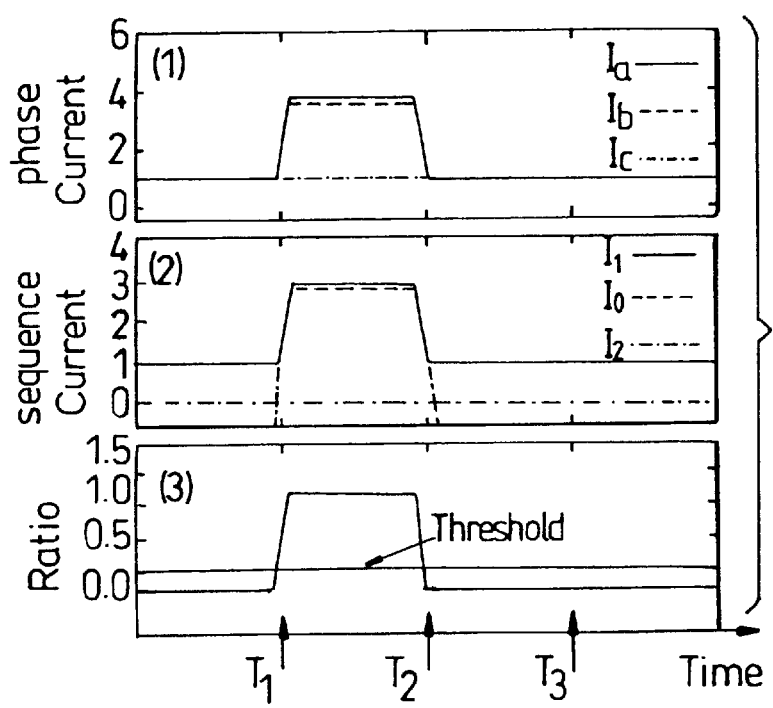
Figure 5A:
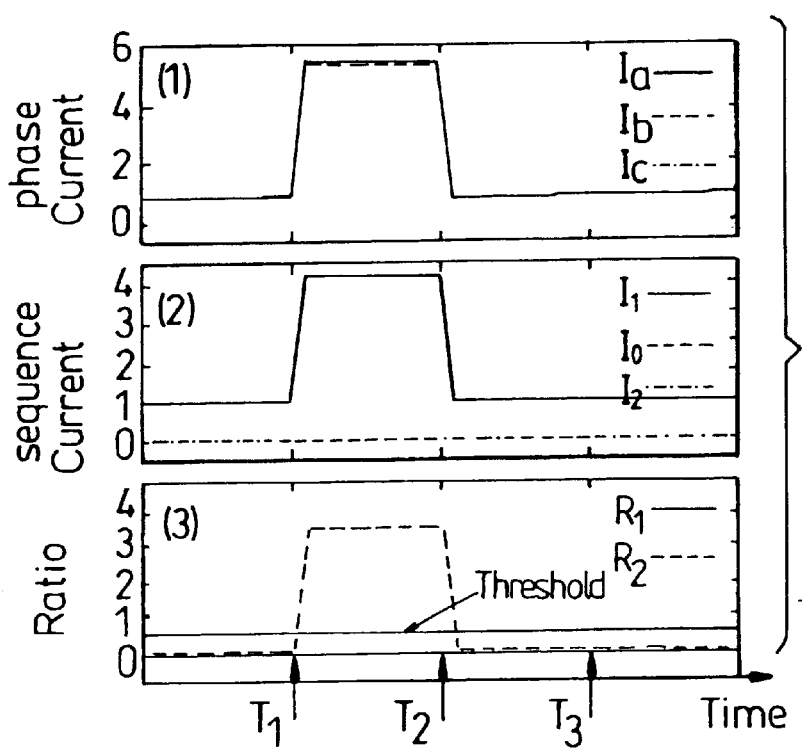
Figure 5B:
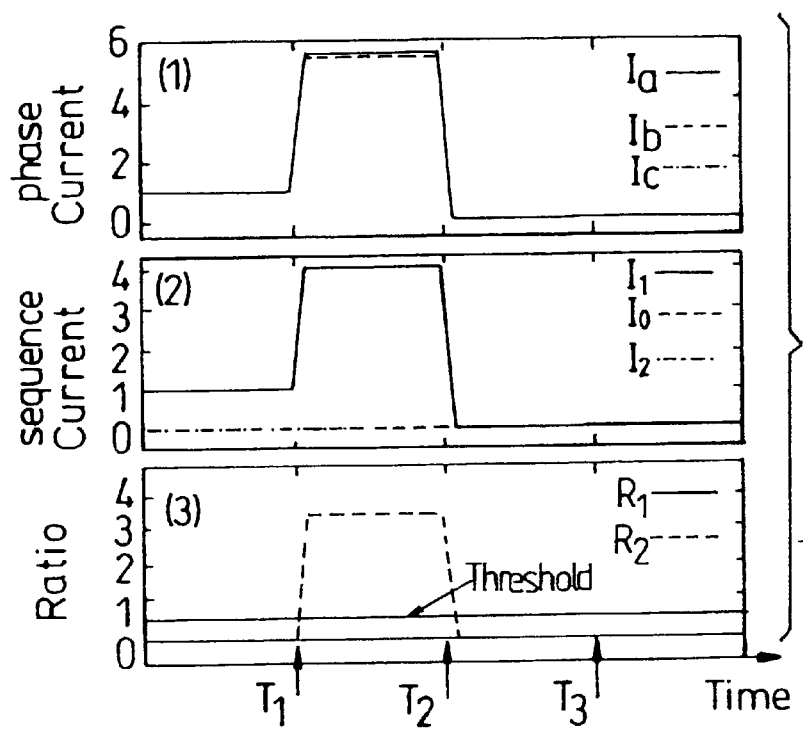
Figure 5C:
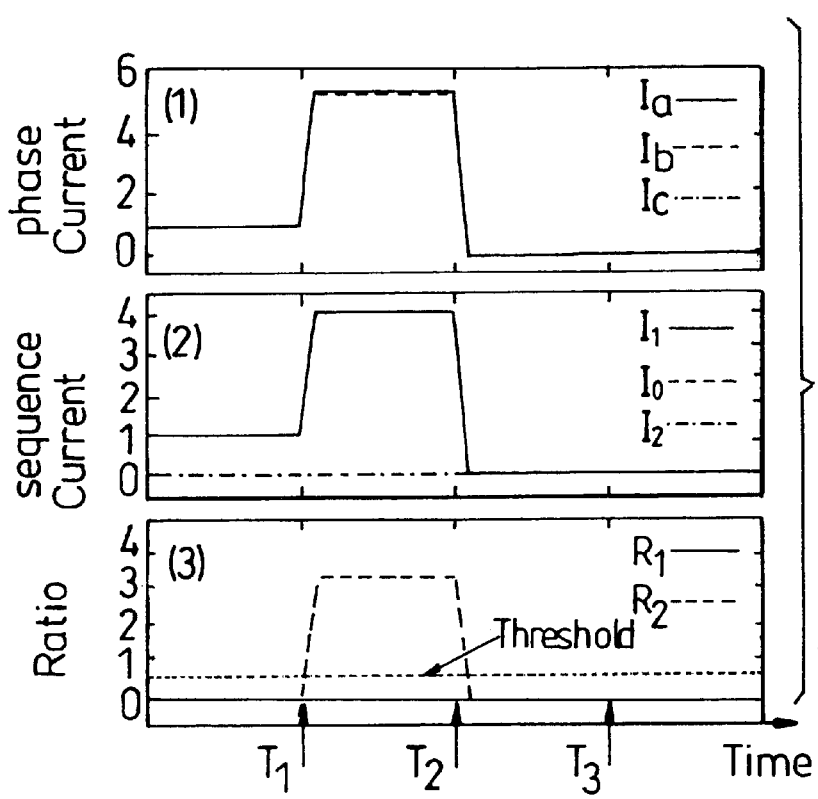
Figure 5D:
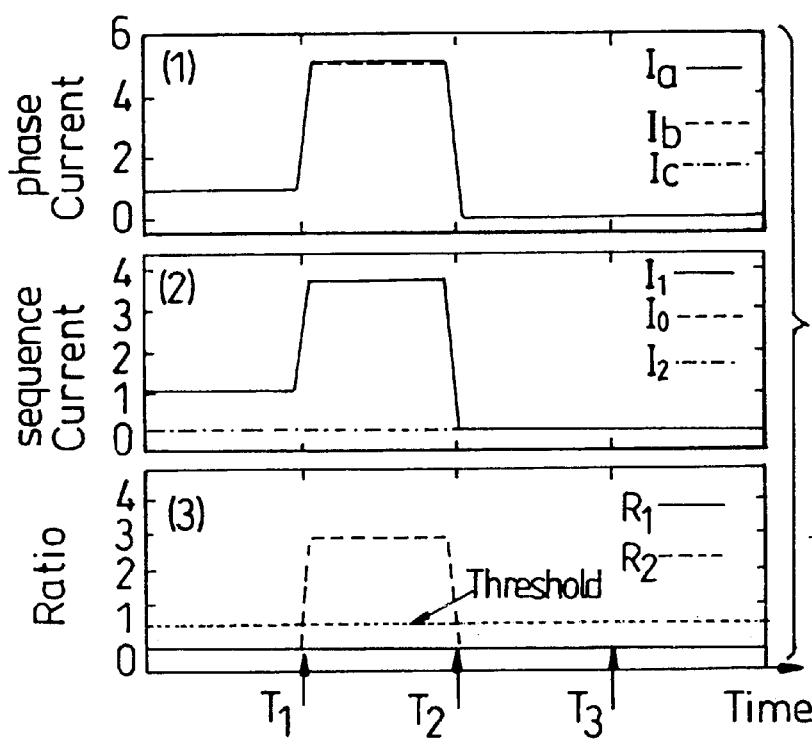
Figure 5E:
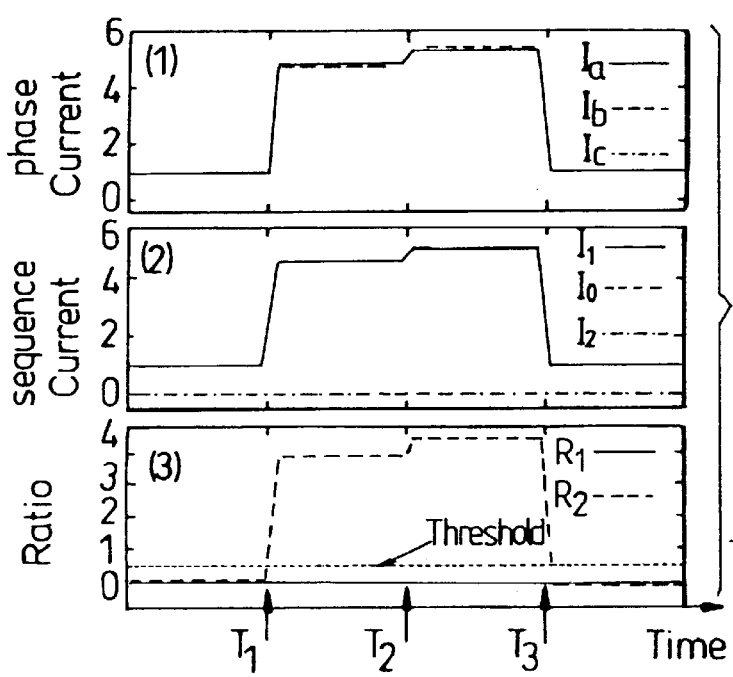

Since this is a resistance earth fault, the faulted currents are supplied to the fault path from both sides of the line section LINE 4. The opening the circuit breaker at B4F will also cut the power supply from the B4F side to LINE 4, as a result, there is an increase in the magnitude of fault current from the B4R side to the fault path after the opening of B4F at time $T_2$ as shown in FIGS. 4e(1) and subsequently the positive sequence current and the ratio signal $R_2$ as shown in FIGS. 4e(2) and 4e(3) respectively. The relay R4R detects the operation of the circuit breaker B4F through the change in the ratio signal $R_2$ at time $T_2$, makes an accelerated tripping decision and opens its associated circuit breaker B4R at time $T_3$ and the faulted line section is isolated from both ends.

It will be understood by the man skilled in the art that the invention provides a time graded protection apparatus in which accelerated opening of one or more of the circuit breakers can be achieved in the event that the fault condition meets predetermined criteria.

In particular, these criteria may include the fault being on the section of line associated with the circuit breaker. Also, the predetermined fault criteria may only be met once a remote circuit breaker has closed and the fault is not cleared from the protected portion of line. The closure of a remote breaker can be detected from changes in the line current after initial fault detection. The clearance at the fault can also be detected from measurements of the line signal.

What is claimed is:

1. A fault protection apparatus for use in a time graded fault protection scheme, comprising: a circuit breaker having a normally closed trip contact provided in a line, a current measurement means for producing an output signal indicative of a current in the line at the circuit breaker, a fault signal processing means for processing the output signal from the current measurement means to detect an initial fault on the line at a first instance, the fault signal processing means being further operative for processing the output signal of the current measurement means after the initial fault has been detected and to produce an accelerated opening signal in the event that the output signal meets a predetermined criterion by combining a value of the output signal obtained substantially at the instant that the initial fault was detected with a value of the output signal obtained after the initial fault was detected, and a control means operative for opening the circuit breaker trip contact in response to the accelerated opening signal.

2. The fault protection apparatus according to claim 1, wherein the output signal meets the predetermined criterion when an event on the line indicative of an operation of a remote circuit breaker on the line occurs and the output signal after the operation remains indicative of a fault on the line.

3. The fault protection apparatus according to claim 2, wherein the control means instantly opens the circuit breaker trip contact when the accelerated opening signal is produced.

4. The fault protection apparatus according to claim 1, wherein, in the event that the output signal indicates that a remote circuit breaker has opened and the fault has been cleared from a protected portion of the line, the control means does not generate the accelerated opening signal and does not open the circuit breaker trip contact.

5. The fault protection apparatus according to claim 1, wherein the current measurement means comprises a forward current measurement means and a reverse current measurement means operative for respectively producing output signals indicative of the respective currents flowing in opposite directions along the line.

6. The fault protection apparatus according to claim 5, wherein two fault signal processing means are provided, one for each direction.

7. The fault protection apparatus according to claim 6, wherein the fault signal processing means are operative for producing the accelerated opening signal if the output signal meeting the predetermined criterion is detected by the forward current measurement means but not by the reverse current measurement means.

8. The fault protection apparatus according to claim 6, wherein, in the event that the initial fault is detected by the reverse current measurement means, a time delayed opening signal is generated which is used by the control means to open the circuit breaker trip contact after a predetermined time delay.

9. A directional time graded fault protection apparatus for an electrical line, comprising: at least two fault protection assemblies respectively provided at a first end and a second end of a protected portion of the line, each fault protection assembly comprising at least one circuit breaker, a forward current measurement means and a reverse current measurement means associated with each circuit breaker, the forward current measurement means being operative for measuring current flowing in the line from a first direction, the reverse current measurement means being operative for measuring current flowing in the line from a second direction opposite to the first direction, control means associated with each circuit breaker, each control means being operative for opening its respective circuit breaker after a first predetermined period of time in response to an initial fault detected by processing an output signal of the forward current measurement means associated with the circuit breaker, and a fault signal processing means associated with at least one of the circuit breakers and operative for monitoring an output signal of its associated reverse current measurement means so that, in the event that the output signal from the reverse current measurement means meets a predetermined criterion after an initial fault has been detected, the fault signal processing means is operative for signaling its associated control means to open the respective circuit breaker at an accelerated time.

10. The directional time graded fault protection apparatus according to claim 9, wherein, in the event that the output signal from the reverse current measurement means meets the predetermined criterion, the fault signal processing means is operative for producing an accelerated opening signal which is used by the control means to open the respective circuit breaker.

11. The directional time graded fault protection apparatus according to claim 9, wherein, in the event that the output signal from the reverse current measurement means does not meet the predetermined criterion, the control means is operative to cause the respective circuit breaker to open after a predetermined time period has elapsed since an initial fault was detected by the reverse current measurement means.

12. The directional time graded fault protection apparatus according to claim 9, wherein each current measurement means comprises a voltage signal measurement means for measuring a voltage on the line, and for processing the voltage to the current flowing in the line.

13. The directional time graded fault protection apparatus according to claim 9, and further comprising additional fault protection assemblies comprising at least one additional circuit breaker, at least one additional associated control means, and at least one additional forward and reverse current measurement means provided in the line.

14. The directional time graded fault protection apparatus according to claim 13, wherein a fault signal processing means is associated with each respective circuit breaker.

15. The directional time graded fault protection apparatus according to claim 14, wherein each fault signal processing means is operative for producing the output signal of its associated reverse current measurement means, the output signal being indicative of the initial fault by processing the output signal from the reverse current measurement means.

16. The directional time graded fault protection apparatus according to claim 9, wherein the predetermined criterion used by the fault signal processing means to make an accelerated opening decision is satisfied if the current measured after the detection of the initial fault indicates that a remote circuit breaker on the line in the direction of the measured fault has opened and the fault has not been cleared from the protected portion of the line.

17. The directional time graded fault protection apparatus according to claim 9, wherein the fault signal processing means is operative for producing an accelerated trip signal by combining values of the output signals obtained substantially at the instant that the initial fault was detected with values of the output signals obtained after the initial fault was detected.

18. The directional time graded fault protection apparatus according to claim 9, wherein the circuit breaker comprises a forward circuit breaker and a reverse circuit breaker associated with the forward current measurement means and the reverse current measurement means, respectively.

19. The directional time graded fault protection apparatus according to claim 18, wherein the forward circuit breaker and the reverse circuit breaker are located on opposite ends of a load on the line.

* * * * *